(12) United States Patent
Feledziak et al.

(10) Patent No.: US 8,324,893 B2
(45) Date of Patent: Dec. 4, 2012

(54) MEASUREMENT METHOD, SENSOR ARRANGEMENT, AND METHOD FOR CONSTRUCTING A MEASUREMENT SYSTEM

(75) Inventors: Philippe Feledziak, Pischelsdorf (AT); Marcel Urban, Fernitz (AT)

(73) Assignee: Austriamicrosystems AG, Unterpremstaetten (AT)

( * ) Notice: Subject to any disclaimer, the term of this patent is extended or adjusted under 35 U.S.C. 154(b) by 179 days.

(21) Appl. No.: 12/743,335
(22) PCT Filed: Nov. 12, 2008
(86) PCT No.: PCT/EP2008/065389
§ 371 (c)(1), (2), (4) Date: Sep. 22, 2010
(87) PCT Pub. No.: WO2009/062958
PCT Pub. Date: May 22, 2009

(65) Prior Publication Data
US 2011/0062950 A1    Mar. 17, 2011

(30) Foreign Application Priority Data
Nov. 16, 2007   (DE) .................... 10 2007 054 801

(51) Int. Cl.
*G01B 7/30* (2006.01)
(52) U.S. Cl. .................. 324/207.25; 324/207.11
(58) Field of Classification Search ........... 324/207.11, 324/207.25, 174
See application file for complete search history.

(56) References Cited

U.S. PATENT DOCUMENTS

| | | | |
|---|---|---|---|
| 5,796,249 A | 8/1998 | Andräet et al. | |
| 6,304,074 B1 | 10/2001 | Waffenschmidt | |

FOREIGN PATENT DOCUMENTS

| | | |
|---|---|---|
| DE | 195 10 579 | 8/1997 |
| DE | 198 52 502 | 5/2000 |
| DE | 698 16 755 | 6/2004 |
| EP | 1 762 826 | 3/2007 |
| EP | 1 767 903 | 3/2007 |
| EP | 1 967 824 | 3/2007 |
| WO | WO 98/54547 | 12/1998 |
| WO | WO 2005/029106 | 3/2005 |
| WO | WO 2006/102967 | 10/2006 |
| WO | WO 2007/031167 | 3/2007 |

OTHER PUBLICATIONS

"AS5040—10 Bit Programmable Magnetic Rotary Encoder", Data Sheet, austriamicrosystems AG, Austria, Revision 1.1, pp. 1-20.
"AS5045—12 Bit Programmable Magnetic Rotary Encoder", Data Sheet, austriamicrosystems AG, Austria, Revision 1.2 (Oct. 3, 2006), pp. 1-20.

*Primary Examiner* — Bot Ledynh
(74) *Attorney, Agent, or Firm* — Cozen O'Connor

(57) ABSTRACT

In a measurement method, a plurality of magnetic field sensors (MS0-MS15) that are arranged along a circular periphery (CIR) and are each configured to emit a sensor signal (H0-H15) as a function of a magnetic field intensity is provided. A diametrically magnetized magnetic source (MAG) seated rotatably on the circular periphery (CIR) about an axis of rotation (RA) is further provided. A first set of sensor signals from the magnetic field sensors (MS0-MS15) is received and a first orientation (AL1) of an axis (AX) defined by a reference value transition (RFD) is determined as a function the first set. After a rotation of the magnetic source (MAG) about the axis of rotation (RA), a second set of sensor signals is received and a second orientation (AL2) of the axis (AX) is determined as a function of the second set of sensor signals. A position (X0, Y0) of the axis of rotation (RA) is acquired as a function of the first and the second orientation (AL1, AL2).

15 Claims, 3 Drawing Sheets

MEASUREMENT METHOD, SENSOR ARRANGEMENT, AND METHOD FOR CONSTRUCTING A MEASUREMENT SYSTEM

RELATED APPLICATION

This is a U.S. National Phase Application under 35 USC §371 of International Application PCT/EP2008/065389 filed on Nov. 12, 2008.

This patent application claims the priority of German patent application no. 10 2007 054 801.1 filed Nov. 16, 2007, the disclosure content of which is hereby incorporated by reference.

FIELD OF THE INVENTION

The invention relates to a measurement method, a sensor arrangement for use with a diametrically magnetized magnetic source, and a method for constructing a measurement system with such a sensor arrangement.

BACKGROUND OF THE INVENTION

Sensor arrangements that comprise magnetic field sensors for measuring magnetic field intensity can be used to determine an angular deviation of a magnetic source in relation to the position or orientation of the magnetic field. Diametrically magnetized and rotatably seated magnetic sources are frequently used for this.

The magnetic field sensors can be arranged along a circular periphery and provide sensor signals over this periphery that form approximately a sinusoidal curve, depending on the position and orientation of the magnetic source. For a diametrically magnetized magnet, for example, sensor signals from magnetic field sensors can be evaluated in such a manner that an angle of rotation of the magnetic source can be determined within a full rotation of 360° based on the measured signals.

Examples of methods and arrangements for determining an angle of rotation are disclosed, for instance, in the publication EP 1967824 A1, which is hereby incorporated by reference in the full scope of its disclosure.

For a precise angle determination, however, it is advantageous if an axis of rotation of the magnet runs through the center of the circularly arranged magnetic field sensors. In this case a uniform sinusoidal curve over all the magnetic field sensors along the circular periphery appears, without the occurrence of variations of the respective signal amplitudes as a function of the angle of rotation.

In the construction of a measurement arrangement, it is possible for a reference point to be marked in a housing of an integrated module, for example, with which the axis of rotation of the magnetic source can be oriented optically or mechanically. However, if the arrangement is mounted in the interior of the housing that comprises the magnetic field sensors, with a specified tolerance of its position in the housing, there can nevertheless be deviations between the axis of rotation and the center of the magnetic field sensors, so that measurement precision is impaired.

Alternatively, a curve of measured magnetic field intensities can be evaluated over a full revolution of the magnet by means of a linearity observation in order to find an optimal position for the axis of rotation of the magnetic source. Such a method is connected with an increased effort in terms of time and production technology, however.

SUMMARY OF THE INVENTION

One object of the invention is to provide a measurement method and a sensor arrangement with which a position of an axis of rotation of a magnetic source can be determined more precisely and with less effort. Another object of the invention is to provide a method for constructing a measurement system in which a small deviation of an axis of rotation of a magnetic source from a specified position can be achieved.

In an exemplary embodiment of a measurement method, a plurality of magnetic field sensors is provided that are arranged along a substantially circular periphery and are each configured to emit a sensor signal as a function of magnetic field intensity. Additionally, a diametrically magnetized magnetic source is provided that is seated rotatably on the circular periphery about an axis of rotation. From the plurality of magnetic sensors, a first set of sensor signals is received, as a function, for instance, of the magnetic field intensity produced by the magnetic source. As a function of the first set of sensor signals, there is a determination of a first orientation of an axis that is defined by a reference value transition. The orientation is defined in relation to the plurality of magnetic field sensors, for example, their specified arrangement. After the reception of the first set of sensor signals, the magnetic source is rotated about an axis of rotation, the angle of rotation preferably being an arbitrary angle different from a multiple of 180°. A second set of sensor signals is received from the plurality of magnetic field sensors and a second orientation of the axis determined by the reference value transition is determined as a function of the second set of sensor signals, again in relation to the arrangement of the plurality of magnetic field sensors. A position of the axis of rotation in relation to the plurality of magnetic field sensors is determined as a function of the first and second orientation.

A diametrically magnetized magnetic source usually has a diametrical axis, on one side of which a magnetic field intensity greater than a given reference value is induced, while a magnetic field intensity less than the reference value is induced on the other side. A transition across the reference value between the values of the magnetic field intensity separated by the axis therefore represents reference value transition. By evaluating the sensor signals emitted by the magnetic field sensors, a respective orientation of this axis defined by the reference value transition can be determined. The reference value transition, or the axis, accordingly runs through the center or the axis of rotation of the magnetic source. After a rotation of the magnetic source, the second orientation can be determined from an additional set of sensor signals, wherein this position of the axis of rotation can be determined from the thus-acquired orientations, both of which run through the axis of rotation.

By evaluating the orientation of the magnetic source based on axes passing though the position of the axis of rotation, this position can be determined with high precision. Since only two measurements are necessary for the determination of the two orientations, the above-described method can also be performed with little expense. This is also supported by the fact that the angle of rotation of the magnetic source between the detection of the first and second set of sensor signals can be chosen nearly arbitrarily and need not be predetermined.

In different embodiments of the measurement method, the position of the axis of rotation is determined in relation to a center point of the circular periphery. In addition, a position can be assigned to each of the sensor signals that are emitted by the plurality of magnetic field sensors. In other words, the detected sensor signals have a precisely defined spatial relationship that is determined by the position of the corresponding magnetic field sensor that emits the sensor signal.

During the determination of the first and second orientations of the axis in one embodiment of the measurement method, a first interpolated position of the reference value transition is acquired as a function of a first and a second sensor signal from the respective set of sensor signals In a similar manner, a second interpolated position of the reference value transition is acquired as a function of a third and a fourth sensor signal from the respective set of sensor signals The respective orientation of the axis can accordingly be determined as a function of a respective straight-line connection of the first and second interpolated positions.

For example, the first and second interpolated positions are acquired as a function of respectively adjacent sensor signals. Thus, for example, two sensor signals from the respective set of sensor signals can be found for which the one sensor signal is greater than the reference value and the other is smaller than the reference value. A reference value transition can therefore be assumed between the positions of these found sensor signals, so that for a diametrically magnetized magnetic source, two interpolated positions can consequently be found. Based on the respective values of these sensor signals and their positions, a position of the reference value transition can be interpolated.

A straight-line connection of these interpolated positions can accordingly be considered as an axis of the reference value transition. An orientation or a geometrical progression of this axis can be described in a formula or analytically as a function of the interpolated positions.

After a rotation of the magnetic source about the axis of rotation, a second orientation of the axis can be acquired in a similar manner, for example, once again by a formula or analytically. An intersection point of the first and second orientations defined by the axis or the reference value transition can be considered as a position of the axis of rotation due to the geometry of the diametrically magnetized magnetic source. In other words, the position of the axis of rotation is defined by an intersection point of the straight-line connections of the interpolated positions.

In another embodiment of the method, the axis of rotation can be displaced as a function of the determined positions. For example, the axis of rotation or the position of the axis of rotation is displaced according to the ascertained position, which corresponds to a deviation from an ideal position. After the displacement of the axis of rotation, the position of the axis of rotation can again be determined according to the same method as described above, in order to establish whether this new position lies within a specified tolerance.

In another embodiment, angular positions can also be determined as a function of the detected sensor signals. At the same time, the respective position of the axis of rotation can be determined as described above. There can be a message if the determined position of the axis of rotation reaches a deviation from the center of the circular periphery that is greater than or less than a specified deviation. For example, an alarm signal that prompts a correction of the position of the axis of rotation can be emitted in case of an excessively large deviation.

A method according to one of the above-described embodiments can also be performed on a automated basis, controlled, for example, by an additional calibration device with a microcontroller or a programmable circuit. In particular, the magnetic source can be rotated automatically or on a controlled basis.

In an embodiment of a sensor arrangement that is provided for use with a diametrically magnetized magnetic source, the arrangement comprises a plurality of magnetic field sensors that are arranged along a circular periphery and are each configured to emit a sensor signal as a function of magnetic field intensity. The sensor arrangement further comprises an evaluation unit coupled to the magnetic field sensors that is configured to receive a first and a second set of sensor signals from the plurality of magnetic field sensors. The evaluation unit is further configured to determine a first orientation of an axis, defined by a reference value transition, with respect to the plurality of magnetic field sensors as a function of the first set of sensor signals, and a second orientation of the axis as a function of the second set of sensor signals. The evaluation unit is further configured to determine the position of an axis of rotation with respect to the plurality of magnetic field sensors as a function of the first and second orientation.

Since only two sets of sensor signals evaluated in the evaluation unit are required in such a sensor arrangement in order to determine a position of an axis of rotation, a deviation of an axis of rotation of a magnetic source can be determined with little expense. The determination of the position via a first and a second orientation also allows an enhanced precision for the position determination.

In one embodiment, the evaluation unit is configured to determine the position of the axis of rotation in relation to a center of the circular periphery. In another embodiment of the sensor arrangement, the evaluation unit is configured to acquire, in determining the first and second orientation of the axis, a first interpolated position of the reference value transition as a function of a first and a second sensor signal from the respective set of sensor signals, and a second interpolated position of the reference value transition as a function of a third and a fourth sensor signal from the respective set of sensor signals The respective orientation of the axis is acquired by the evaluation unit as a function of a respective straight-line connection of the first and second interpolated positions.

In addition, the position of the axis of rotation can be determined by the evaluation unit by determining an intersection point between the respective straight-line connections, corresponding to the embodiments of the measurement method.

In an additional embodiment of a sensor arrangement, the evaluation unit is configured to issue a message if the determined position of the axis of rotation reaches a deviation from the center of the circular periphery that is greater than or less than a specified deviation.

In additional embodiments of the sensor arrangement, the evaluation unit can be further configured to determine an angle of rotation as a function of the first and/or the second set of sensor signals.

In an embodiment of a method for constructing a measurement system, a sensor arrangement according to one of the above-described embodiments is provided. Additionally, a diametrically magnetized magnetic source is provided that is seated rotatably on the circular periphery about an axis of rotation. A position of the axis of rotation in relation to a center of the circular periphery is determined with the sensor arrangement. The axis of rotation of the magnetic source is displaced as a function of the current position.

With the above-described method, a measurement system can be provided that, because of the correction of the position of the rotational axis of the magnetic source, has only a slight deviation of the magnetic source from a predetermined position. A measurement system constructed in this manner can therefore exhibit a high precision in the determination of an angle of rotation of the magnetic source, for example.

DETAILED DESCRIPTION OF THE DRAWINGS

Figure 1A:
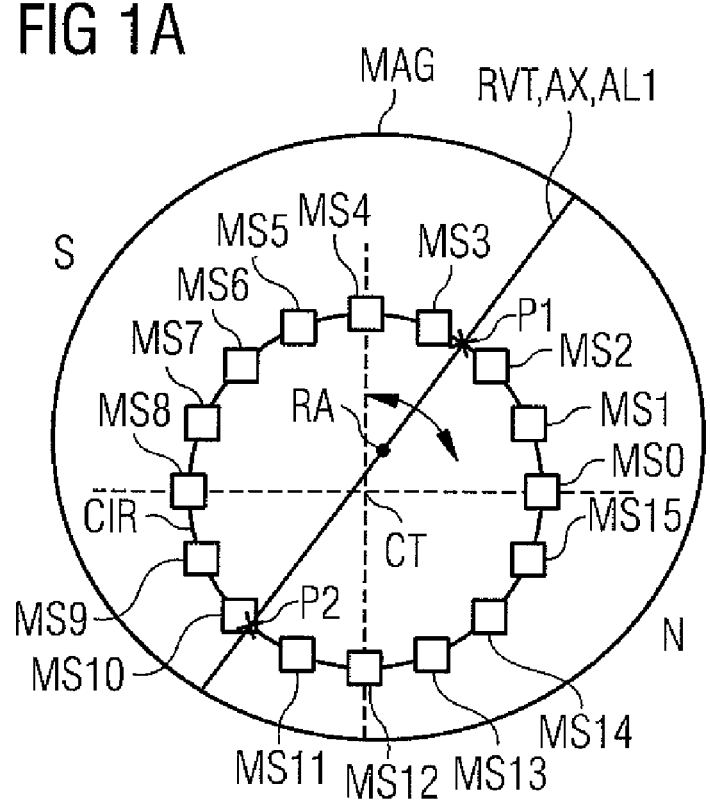
FIGS. 1A and 1B show embodiments with magnetic field sensors and a magnetic source with different angles of rotation.
Figure 1B:
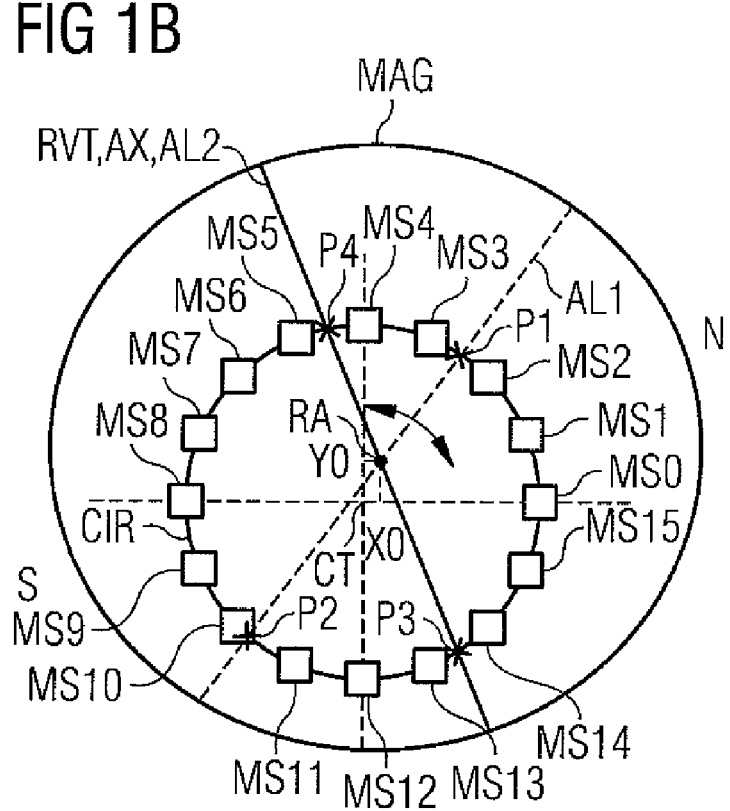

FIGS. 1A and 1B each show a plurality of magnetic field sensors MS0-MS15 that are arranged along a circular periphery CIR with center CT. The magnetic field sensors MS0-MS15 are distributed over the circular periphery in such a manner that an angle between adjacent magnetic field sensors is equally large in each case. Additionally, a respective magnetic source MAG is provided, with a magnetic north pole N and a magnetic south pole S, that is rotatable about an axis of rotation RA. The magnetic source MAG has an axis AX that is defined by a reference value transition RVT between magnetic field intensities that are greater than the reference value and those that are smaller than the reference value.

The magnetic field sensors MS0-MS15 are each configured to emit a sensor signal H0-H15, which is not shown for reasons of clarity, as a function of a magnetic field intensity that is produced essentially by the magnetic source MAG.

With reference to FIG. 1A, the axis AX defined by the reference value transition RVT runs through the position of the rotational axis RA, as well as through a position P1 between the magnetic field sensors MS2 and MS3, and through a position P2 between the magnetic field sensors MS10 and MS11. By evaluating a set of sensor signals H0-H15 that are emitted by the magnetic field sensors MS0-MS15, an orientation AL1 of the axis AX can be determined. Since the position of the magnetic field sensors MS0-MS15 and that of the sensor signals H0-H15 emitted by them is usually known, the orientation AL1 of the axis AX can be described in relation to the magnetic field sensors MS0-MS15 or to the center CT of the circular periphery CIR.

With reference to FIG. 1B, the magnetic source MAG there is rotated relative to the axis of rotation RA in comparison to the arrangement in FIG. 1A. The magnetic source can be rotated automatically or in a controlled manner by an additional calibration unit, not shown for reasons of clarity, with a microcontroller or other programmable circuit. Such a calibration unit may also comprise a corresponding evaluation unit.

The orientation AL2 of the axis AX in this illustration runs through the position of the axis of rotation RA, as in the illustration in FIG. 1A. In relation to the magnetic field sensors MS0-MS15, the orientation AL2 runs through a position 23 between the magnetic field sensors MS13 and MS14 and through a position P4 between the magnetic field sensors MS4 and MS5. As previously explained for FIG. 1A, parameters for determining the second orientation AL2 can be acquired from an additional set of sensor signals that are emitted by the magnetic field sensors MS0-MS15. The first orientation AL1 is additionally drawn in FIG. 1B for reasons of clarity. The position of the axis of rotation RA lies at the intersection point of the two orientations AL1, AL2 and can be represented as a function of the known orientations AL1 and AL2 by corresponding position coordinates X0, Y0 in a coordinate system set up by the plurality of magnetic field sensors MS0-MS15.

The information on the position X0, Y0 of the axis of rotation RA can be used, for instance, to displace the magnetic source MAG or the position of the axis of rotation RA of the magnetic source MAG in such a manner that, after the displacement, the axis of rotation RA runs through the center CT of the circular periphery CIR.

Figure 2:
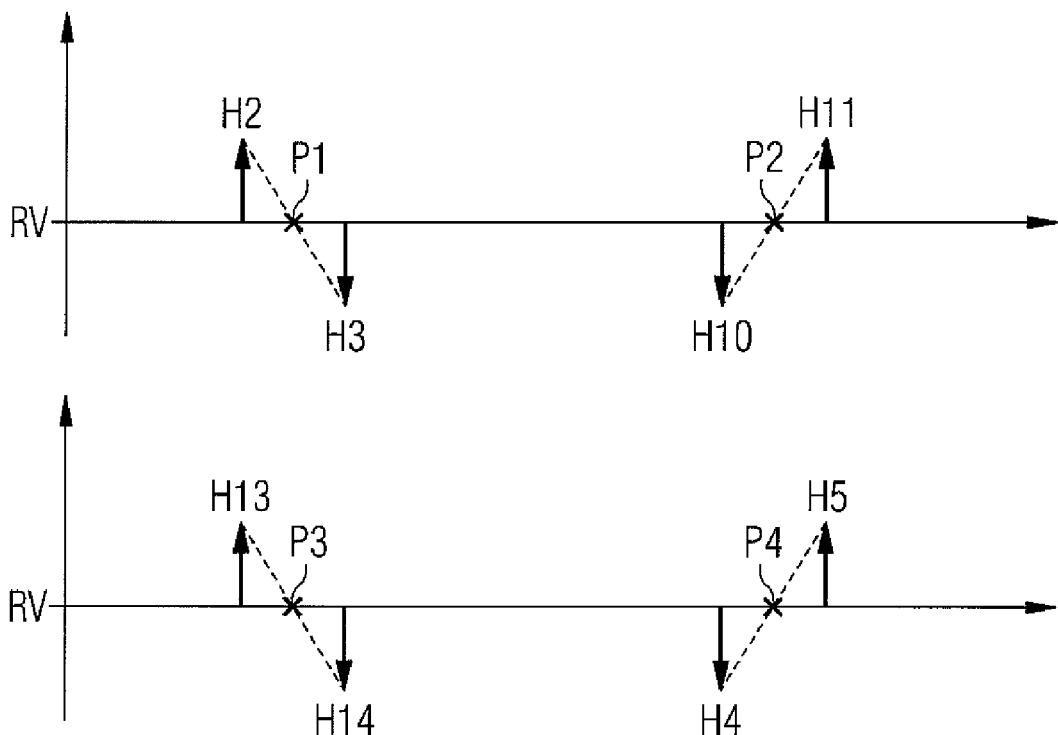
FIG. 2 shows exemplary signal diagrams of sensor signals.

FIG. 2 shows exemplary signal diagrams with sensor signals for determining the interpolated positions of the reference value transition. In the upper diagram, exemplary sensor signals H2, H3, H10, H11 from corresponding magnetic field sensors MS2, MS3, MS10, MS11 are illustrated, with reference to FIG. 1A. In relation to a reference value RV, the value of the sensor signal H2 in this diagram is greater, for example, than the reference value RV and the value of the sensor signal H3 is less than the reference value RV. Accordingly, the position P1 of the reference value transition lies between the positions of the sensor signals H2, H3, or those of the magnetic field sensors MS2, MS3. This position can be interpolated as a function of the absolute or relative deviation of the sensor signals H2, H3 from the reference value RV, in order to obtain the interpolated position P1. In this embodiment, the values of the sensor signals H2, H3 are shown substantially equally large, so that the interpolated position P1 is consequently situated halfway between the magnetic field sensors MS2, MS3, but for different magnitudes of the sensor signals H2, H3, the interpolated position P1 in the diagram can be shifted correspondingly to the left or the right.

In a similar manner, sensor signals H10, H11 around an additional reference value transition are shown, by the values of which signals a second interpolated position P2 of the reference value transition can be determined.

Since the positions of the individual magnetic field sensors MS0-MS15, and thus the sensor signals H0-H15, are known in advance and can be described with corresponding coordinates in a selected coordinate system, the interpolated positions P1, P2 as a function of the sensor signals can likewise be represented as coordinates in this coordinate system. The interpolated positions P1, P2 here can be assumed to lie on a straight-line connection between the magnetic field sensors MS2 and MS3 and between MS10 and MS11 respectively. Alternatively, the curvature of the circular periphery CIR on which the magnetic field sensors are arranged can be taken into account, so that the interpolated positions P1, P2 are assumed to be on the circular periphery CIR.

In the lower diagram in FIG. 2, sensor signals H13, H14, H4, H5, resulting for example from a measurement with an orientation of the magnetic source MAG in accordance with FIG. 1B, are shown in a manner similar to that described for the upper diagram. The interpolated position P3 thus results from the positions of the magnetic field sensors MS13, MS14 in conjunction with the sensor signals H13, H14 emitted by them. In a similar manner, the fourth interpolated position P4 results from the positions of the magnetic field sensors MS4, MS5 in conjunction with the corresponding sensor signals H4, H5.

Figure 3:
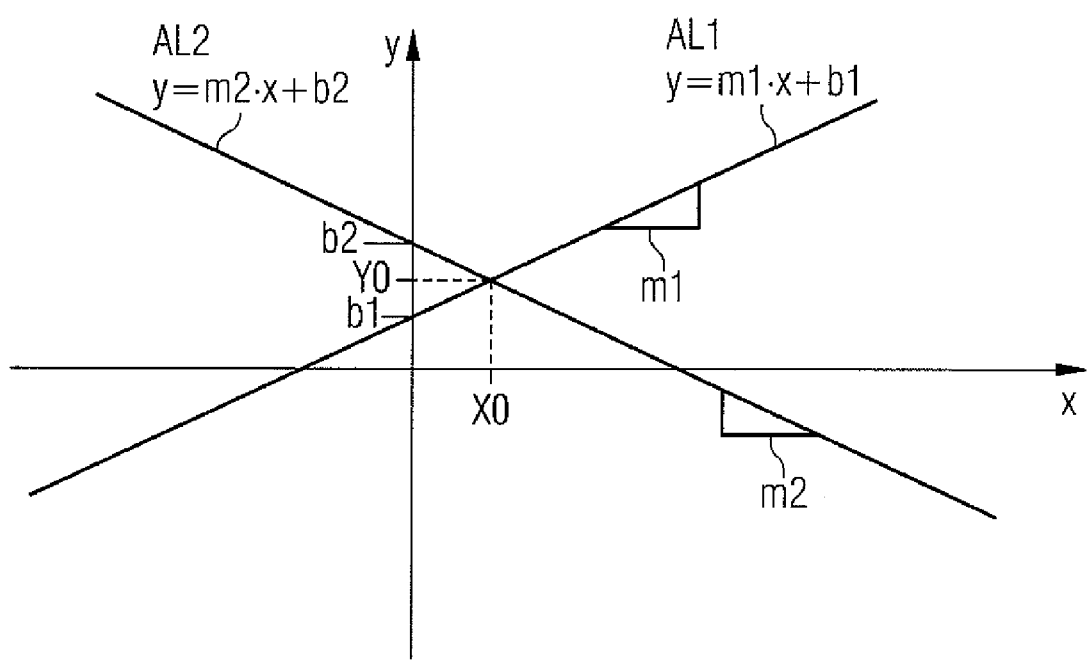
FIG. 3 shows an exemplary geometrical representation of determined orientations.

With the known coordinates of the interpolated positions P1-P4, for example, line equations for the first and second orientations AL1, AL2 can be acquired. Exemplary resulting straight lines in an x, y coordinate system are shown in FIG. 3. From the coordinates of the interpolated positions P1, P2, a slope m1 and a constant factor b1 of the line equation for the first orientation AL1.

$$AL1: y=m1 \cdot x+b1 \quad (1)$$

can be determined in a known manner. From the coordinates of the third and fourth interpolated positions P3 and P4, a line equation for the second orientation can be determined as $$AL2: y=m2 \cdot x+b2, \quad (2)$$

where m2 represents the slope of the line and b2 represents a constant factor of the line.

With reference to the explanations for FIG. 1B, the position X0, Y0 of the axis of rotation can be determined from an intersection point of the two orientations AL1, AL2. For this purpose, a system of linear equations, the solution of which supplies the coordinates X0, Y0, can be set up with equations (1) and (2), for example. For example, the coordinate X0 can be determined by setting equations (1) and (2) equal to one another and solving for the parameter x, so that:

$$X0 = \frac{b2 - b1}{m1 - m2} \quad (3)$$

By inserting equation (3) in equation (1) for example, the coordinate Y0 results as $$Y0 = \frac{m1 \cdot b2 - m2 \cdot b1}{m1 - m2}. \quad (4)$$

The thus-determined position X0, Y0 can be output and used for correcting the position of the axis of rotation. Alternatively, the position X0, Y0 can also be checked as to whether it lies inside a given tolerance range for a deviation from the center CT of the circular periphery CIR.

In addition to the function of determining the position X0, Y0 of the axis of rotation RA of the magnet source MAG, the sensor signals are typically used for determining an angle of rotation Φ of the magnetic source. In this case, the information on the slopes m1, m2 of the first and second orientation AL1, AL2 can be used in at least two ways. If, for example, the x axis of the coordinate system or an axis parallel to it is used as a reference axis for an angle of rotation Φ, an angle of rotation Φ of the magnetic source MAG can be derived in a simple manner from the slopes m1, m2 via, for example, a function based on a tangent function. The computational cost for determining the position X0, Y0, or an angle of rotation Φ of the magnetic source MAG, is therefore reduced. A method and an arrangement for determining an angle of rotation Φ from interpolated positions can be derived, for example, from EP 07004585.1, the disclosure of which was incorporated above by reference.

Figure 4:
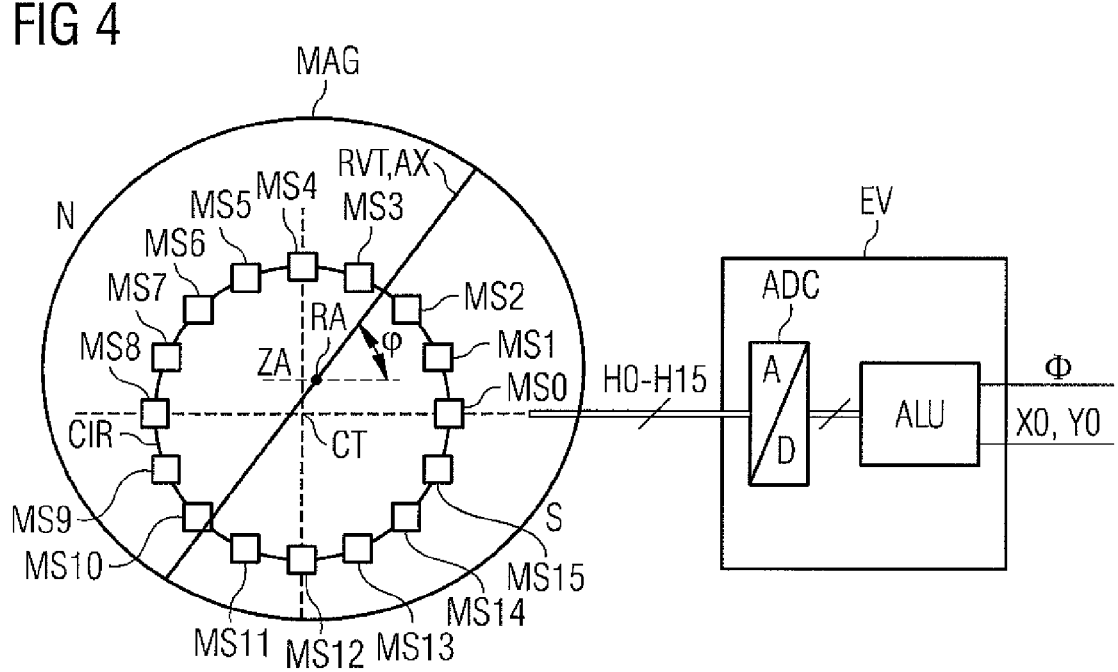
FIG. 4 shows an embodiment of a sensor arrangement.

FIG. 4 shows an embodiment of a sensor arrangement with a plurality of magnetic field sensors MS0-MS15 that are configured to output corresponding sensor signals H0-H15 to an evaluation unit EV. Also shown is the magnetic source MAG, which can be used with the sensor arrangement. The evaluation unit EV comprises, for example, an analog-to-digital converter ADC to which the sensor signals H0-H15 can be supplied in analog form. Digitally converted sensor signals are then output by the analog-to-digital converter ADC to an arithmetic logic unit ALU. The computing unit ALU has outputs, for example, for outputting an angle of rotation Φ and a position X0, Y0 of the axis of rotation RA.

The evaluation unit EV is configured, for example, for determining, with a method according to one of the previously described embodiments, the position X0, Y0 and an angle of rotation σ between the axis AX defined by the reference value transition RVT and a predetermined reference axis ZA. The reference axis ZA in this embodiment is defined by a straight-line connection of the magnetic field sensors MS0 and MS8 or a line parallel thereto. The reference axis ZA can also be defined in any other desired manner, however. The evaluation unit EV is provided, in particular, to determine a first and a second orientation AL1, AL2 for different angles of rotation of the magnetic source MAG and to acquire the position X0, Y0 from the determined orientations. The necessary calculations for this can be performed, for example, in the computing unit ALU.

Figure 5:
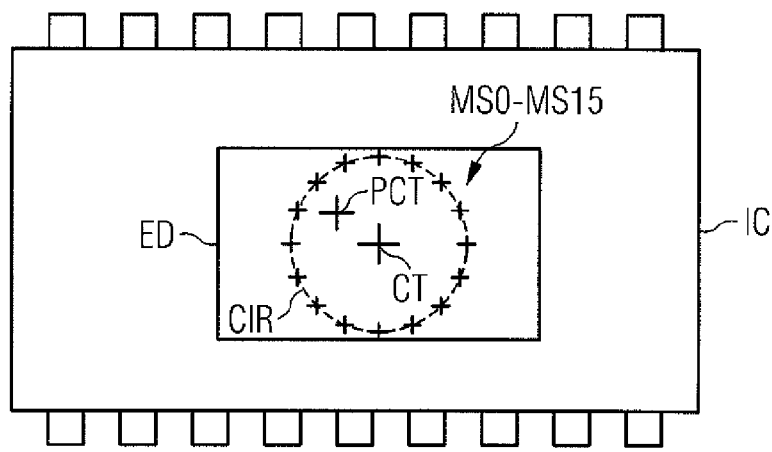
FIG. 5 shows an embodiment of a sensor arrangement as an integrated circuit in a housing.

FIG. 5 shows an embodiment of a sensor arrangement according to one of the above embodiments implemented on a semiconductor chip arranged in a chip housing IC. For reasons of clarity only the semiconductor core ED of the sensor arrangement with the magnetic field sensors MS0-MS15 arranged along a circular periphery CIR about a center CT is shown. The point PCT designates, for example, a center of the housing IC that can be used as a guide for an arrangement of a rotatably seated magnetic source. Preferably, the semiconductor core ED is mounted in the chip housing IC in such a manner that the positions of the housing center PCT and the center CT of the magnetic field sensors MS0-MS15 coincide. Frequently, however, this can be achieved only with a certain tolerance for reasons of manufacturing technology.

In the construction of a measurement system, a magnetic source is first arranged, for example, in such a manner that its axis of rotation RA runs through the center PCT of the chip. For example, as explained above, a reference point is marked in the chip housing. The axis of rotation RA of the magnetic source is oriented optically or mechanically with the reference point. By picking up sensor signals at two different rotational positions of the magnetic source, it is possible with the sensor arrangement to determine the two orientations of the magnetic source, and therefrom the position X0, Y0, or the offset of the axis of rotation from the center CT of the magnetic field sensors MS0-MS15, and to output it via an interface of the sensor arrangement. This information can then be used to modify or correct the position of the axis of rotation, so that the axis of rotation preferably runs through the center CT. If necessary, it can then be checked in additional measurements whether the correct position lies inside a predetermined tolerance range.

In addition to angle measurements that can be performed with the sensor arrangement, the position of the axis of rotation can be checked permanently or at set points in time. If, for example, a deviation of the position beyond a tolerance range is noted during the operation of the measurement system, a warning or alarm signal can be emitted via an interface of the sensor arrangement or the measurement system, for example.

Even though 16 magnetic field sensors MS0-MS15 were used in each of the present embodiments, any desired other number of magnetic field sensors, greater than or less than 16, can be used in other embodiments of the measurement method or the sensor arrangement. In different embodiments it is likewise possible, instead of evaluating adjacent sensor signals, to use or evaluate sensor signals that are not positioned directly next to one another, but are produced, for example from two sensor signals generated by magnetic field sensors between which an additional magnetic field sensor is arranged.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A measurement method, comprising:
   providing a plurality of magnetic field sensors that are arranged along a circular periphery and are each configured to emit a sensor signal as a function of a magnetic field intensity;
   providing a diametrically magnetized magnetic source that is seated rotatably on the circular periphery about an axis of rotation;
   receiving a first set of sensor signals from the plurality of magnetic field sensors;
   determining a first orientation of an axis, determined by a reference value transition, in relation to the plurality of magnetic sensors as a function of the first set of sensor signals;
   rotating the magnetic source about the axis of rotation;
   receiving a second set of sensor signals from the plurality of magnetic field sensors;
   determining a second orientation of the axis as a function of the second set of sensor signals; and
   determining a position of the axis of rotation in relation to the plurality of magnetic field sensors as a function of the first and second orientations.

2. The measurement method according to claim 1, wherein a position is assigned to each of the sensor signals that are emitted by the plurality of magnetic field sensors.

3. The measurement method according to claim 2, wherein each of the steps of determining the first and second orientations of the axis comprises:
   acquiring a first interpolated position of the reference value transition as a function of a first and a second sensor signal from the respective set of sensor signals;
   acquiring a second interpolated position of the reference value transition as a function of a third and a fourth sensor signal from the respective set of sensor signals; and
   acquiring the respective orientation of the axis as a function of a respective straight-line connection of the first and second interpolated positions.

4. The measurement method according to claim 3, wherein the first and second interpolated positions are acquired as a function of respective adjacent sensor signals.

5. The measurement method according to claim 3 wherein the position of the axis of rotation is determined by acquiring an intersection point between the respective straight-line connections.

6. The measurement method according to claim 1, wherein the axis of rotation is shifted as a function of the determined position.

7. The measurement method according to claim 1, wherein the position of the axis of rotation is determined in relation to a center of the circular periphery.

8. The measurement method according to claim 7, wherein there is a message if the determined position of the axis of rotation reaches a deviation from the center of the circular periphery that is greater than or less than a specified deviation.

9. A sensor arrangement for use with a diametrically magnetized magnetic source, the sensor arrangement comprising:
   a plurality of magnetic field sensors that are arranged along a circular periphery and are each configured to emit a sensor signal as a function of a magnetic field intensity; and
   an evaluation unit coupled to the magnetic field sensors that is configured to
      receive a second set of sensor signals from the plurality of magnetic field sensors;
      determine a first orientation of an axis, determined by a reference value transition, in relation to the plurality of magnetic sensors as a function of the first set of sensor signals;
      determine a second orientation of the axis as a function of the second set of sensor signals; and
      determine a position of the rotational axis in relation to the plurality of magnetic field sensors as a function of the first and second orientations.

10. The sensor arrangement according to claim 9, wherein the evaluation unit is configured to acquire, in the determination of the first and second orientations of the axis:
   a first interpolated position of the reference value transition as a function of a first and a second sensor signal from the respective set of sensor signals;
   a second interpolated position of the reference value transition as a function of a third and a fourth sensor signal from the respective set of sensor signals; and
   the respective orientation of the axis as a function of a respective straight-line connection of the first and second interpolated positions.

11. The sensor arrangement according to claim 10, wherein the evaluation unit is configured to determine the position of the axis of rotation by acquiring an intersection point between the respective straight-line connections.

12. The sensor arrangement according to claim 9, wherein the evaluation unit is configured to determine the position of the axis of rotation in relation to a center of the circular periphery.

13. The sensor arrangement according to claim 12, wherein the evaluation unit is configured to issue a message if the determined position of the axis of rotation reaches a deviation from the center of the circular periphery that is greater than or less than a specified deviation.

14. The sensor arrangement according to claim 9, wherein the evaluation unit is further configured to determine an angle of rotation as a function of the first and/or the second set of sensor signals.

15. A method for constructing a measurement system, comprising:
   providing a sensor arrangement according to claim 9;
   providing a diametrically magnetized magnetic source that is seated rotatably on the circular periphery about an axis of rotation;
   determining the sensor arrangement of a position of the axis of rotation in relation to a center of the circular periphery; and
   displacing the axis of rotation of the magnetic source as a function of the determined position.

* * * * *